United States Patent
Nakao et al.

(10) Patent No.: US 8,374,277 B2
(45) Date of Patent: Feb. 12, 2013

(54) WIRELESS COMMUNICATION MOBILE STATION DEVICE AND METHOD FOR USING PRECODING MATRIX

(75) Inventors: Seigo Nakao, Kanagawa (JP); Masayuki Hoshino, Kanagawa (JP); Daichi Imamura, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 274 days.

(21) Appl. No.: 12/920,024

(22) PCT Filed: Mar. 13, 2009

(86) PCT No.: PCT/JP2009/001130
§ 371 (c)(1),
(2), (4) Date: Aug. 27, 2010

(87) PCT Pub. No.: WO2009/122658
PCT Pub. Date: Oct. 8, 2009

(65) Prior Publication Data
US 2011/0002415 A1    Jan. 6, 2011

(30) Foreign Application Priority Data
Apr. 4, 2008 (JP) .................. 2008-098395

(51) Int. Cl.
*H04B 7/02* (2006.01)

(52) U.S. Cl. ........ 375/267; 375/260; 375/295; 375/296; 375/299; 375/347; 455/101; 455/132; 455/500; 455/562.1; 370/210; 370/334; 370/344; 370/480

(58) Field of Classification Search .................. 375/260, 375/267, 295, 296, 299, 347; 455/101, 132, 455/500, 562.1; 370/210, 334, 344, 480
See application file for complete search history.

(56) References Cited

U.S. PATENT DOCUMENTS

| | | | |
|---|---|---|---|
| 7,433,419 B2 * | 10/2008 | Yun et al. ................ | 375/296 |
| 2006/0262870 A1 * | 11/2006 | Khan ....................... | 375/260 |
| 2008/0123602 A1 * | 5/2008 | Beek et al. ................ | 370/336 |

OTHER PUBLICATIONS

International Search Report dated Apr. 21, 2009.
3GPP Ran1#50bis, "UL Sounding RS Control Signaling for Antenna Selection," Mitsubishi Electric, R1-073932, Oct. 2007, pp. 1-9.
3GPP TSG RAN WG1 #49, "Way forward for UL Sounding RS," Motorola, R1-072161, May 2007, pp. 1-3.
3GPP TS 36.211 v8.1.0, "Evolved Universal Terrestrial Radio Access (E-UTRA); Physical Channels and Modulation (Release 8)," Nov. 2007, pp. 1-54.

* cited by examiner

*Primary Examiner* — Leon Flores
(74) *Attorney, Agent, or Firm* — Dickinson Wright PLLC

(57) ABSTRACT

Provided is a wireless communication mobile station device capable of suppressing an increase in an SRS resource even when the mobile station is provided with a plurality of antennas. In the device, a weighting section (115) weights transmission data inputted from an IFFT section (111) and an SRS inputted from an IFFT section (114) by using a precoding matrix ($\phi$) and a precoding matrix ($\phi_{inv}$) orthogonal to the precoding matrix ($\phi$). A control unit (106) controls the interval for using the precoding matrix ($\phi_{inv}$) independently of the interval for using the precoding matrix ($\phi$).

9 Claims, 10 Drawing Sheets

WIRELESS COMMUNICATION MOBILE STATION DEVICE AND METHOD FOR USING PRECODING MATRIX

TECHNICAL FIELD

The present invention relates to a radio communication mobile station apparatus and a method for using a precoding matrix.

BACKGROUND ART

In 3GPP RAN LTE (3rd Generation Partnership Project Radio Access Network Long Term Evolution), OFDMA (Orthogonal Frequency Division Multiple Access) has been adopted as a downlink communication method, and SC-FDMA (Single Carrier Frequency Division Multiple Access) has been adopted as an uplink communication method.

With LTE, a radio communication base station apparatus (hereinafter abbreviated to "base station") performs scheduling not only of downlink resources, but also of all uplink resources. That is to say, a base station transmits control information for reporting a result of allocation of uplink resources to be used for uplink data transmission by a radio communication mobile station apparatus (hereinafter abbreviated to "mobile station") to a mobile station. Then, on receiving this control information, a mobile station transmits transmission data (uplink data) using an uplink resource indicated by the control information.

With LTE, an RS (Reference Signal) using a specific resource for each mobile station is used by a base station to obtain uplink channel information. An RS may be a DM (Demodulation) RS used for channel estimation for data demodulation, or an SRS (Sounding RS) used for channel quality estimation for frequency scheduling (see Non-Patent Document 1, for example). A DM RS is added to transmission data and transmitted at the same time as transmission data, whereas an SRS is normally transmitted over a wider band than a DM RS, independently of transmission data.

Also, with LTE, a mobile station is assumed to be provided with one antenna, and therefore a base station allocates only one SRS resource, which is an uplink resource for transmitting an SRS, to one mobile station. Here, SRS resources allocated to mobile stations are mutually orthogonal in the time domain, in the frequency domain, or in code space, and a base station can separate SRSs from mobile stations without interference. For example, when the SRSs of mobile station 1 and mobile station 2 are made orthogonal in the time domain, the base station directs mobile station 1 to transmit an SRS in slot 1 of each subframe, and directs mobile station 2 to transmit an SRS in slot 2 of each subframe.

On receiving SRSs from mobile stations, the base station performs uplink resource scheduling for each mobile station based on the relevant SRS. Also, the base station uses an SRS to generate a CQI (Channel Quality Indicator) indicating frequency domain channel quality, and decides a modulation method and coding rate (MCS: Modulation and Coding Scheme) to be used by a mobile station for uplink data based on the CQI.

Non-Patent Document 1: 3GPP TS 36.211 V8.1.0, "Physical Channels and Modulation (Release 8)," November 2007

DISCLOSURE OF INVENTION

Problems to be Solved by the Invention

It is assumed here that a mobile station is provided with a plurality of antennas in a fourth-generation mobile communication system such as IMT-Advanced. When a mobile station is provided with a plurality of antennas, in order to improve uplink resource utilization efficiency, application of a radio communication system of the space division multiplexing (SDM) scheme can be considered, in which a mobile station transmits a plurality of transmission data by means of a plurality of antennas at the same time and using the same frequency resource, and a base station separates a plurality of space-multiplexed signals. An SDM radio communication system presupposes that the transmitting side (mobile station) and receiving side (base station) are provided with a plurality of antennas, and is also referred to as SU-MIMO (Single-user MIMO) as one form of MIMO (Multiple-Input Multiple-Output) communication.

When a mobile station is provided with a plurality of antennas, a base station indicates transmission weighting for the plurality of antennas of the mobile station, called a Precoding Matrix (PM) or precoding vector, to the mobile station. Also, when an SDM method is used, a base station indicates an optimum space multiplexing number (hereinafter referred to as "RANK number") to a mobile station. In order for a base station to indicate an optimum precoding matrix and RANK number to a mobile station, it is necessary for all channel information relating to channels between the antennas with which the base station is provided and the antennas with which the mobile station is provided to be known to the base station.

Also, in order to perform optimization of an MCS used by a mobile station for uplink data, it is necessary for the base station to perform frequent CQI updating.

Thus, when a mobile station provided with a plurality of antennas is used, it is necessary for a base station to obtain channel information on channels between each antenna of the base station and each antenna of the mobile station in order to update a precoding matrix, RANK number, and CQI.

However, when the above-described conventional LTE technology is applied to a mobile station provided with a plurality of antennas, mutually orthogonal SRSs must be transmitted to each of the plurality of antennas of the mobile station in order to obtain channel information on channels between each antenna of the base station and each antenna of the mobile station. That is to say, the base station must allocate to a mobile station a number of SRS resources equivalent to the number of antennas with which the mobile station is provided. Consequently, when the above-described conventional LTE technology is applied to a mobile station provided with a plurality of antennas, SRS resources increase.

It is an object of the present invention to provide a radio communication mobile station apparatus and a method for using a precoding matrix that enable an increase in SRS resources to be suppressed even when the mobile station is provided with a plurality of antennas.

Means for Solving the Problem

A radio communication mobile station apparatus of the present invention employs a configuration having a weighting section that weights transmission data and a reference signal using a first precoding matrix and a second precoding matrix orthogonal to the first precoding matrix, and a control section that controls an interval for using the second precoding matrix independently of an interval for using the first precoding matrix.

Advantageous Effects of Invention

The present invention enables an increase in SRS resources to be suppressed even when a mobile station is provided with a plurality of antennas.

BEST MODE FOR CARRYING OUT THE INVENTION

Now, embodiments of the present invention will be described in detail with reference to the accompanying drawings. For the sake of simplicity and brevity, only configuration sections of a mobile station relating to reception of control information and transmission of uplink data (transmission data and SRSs) closely related to the present invention are covered in the following description, and illustrations and descriptions of configuration sections relating to the reception of downlink data in the present invention are omitted.

Also, in the following description, an interval for using a precoding matrix indicated to a mobile station from a base station, and an interval for using a precoding matrix orthogonal to that precoding matrix, are assumed to be intervals for use in the time domain.

(Embodiment 1)

In this embodiment, a case in which the RANK number (space multiplexing number) is 1 will be described.

Figure 1:
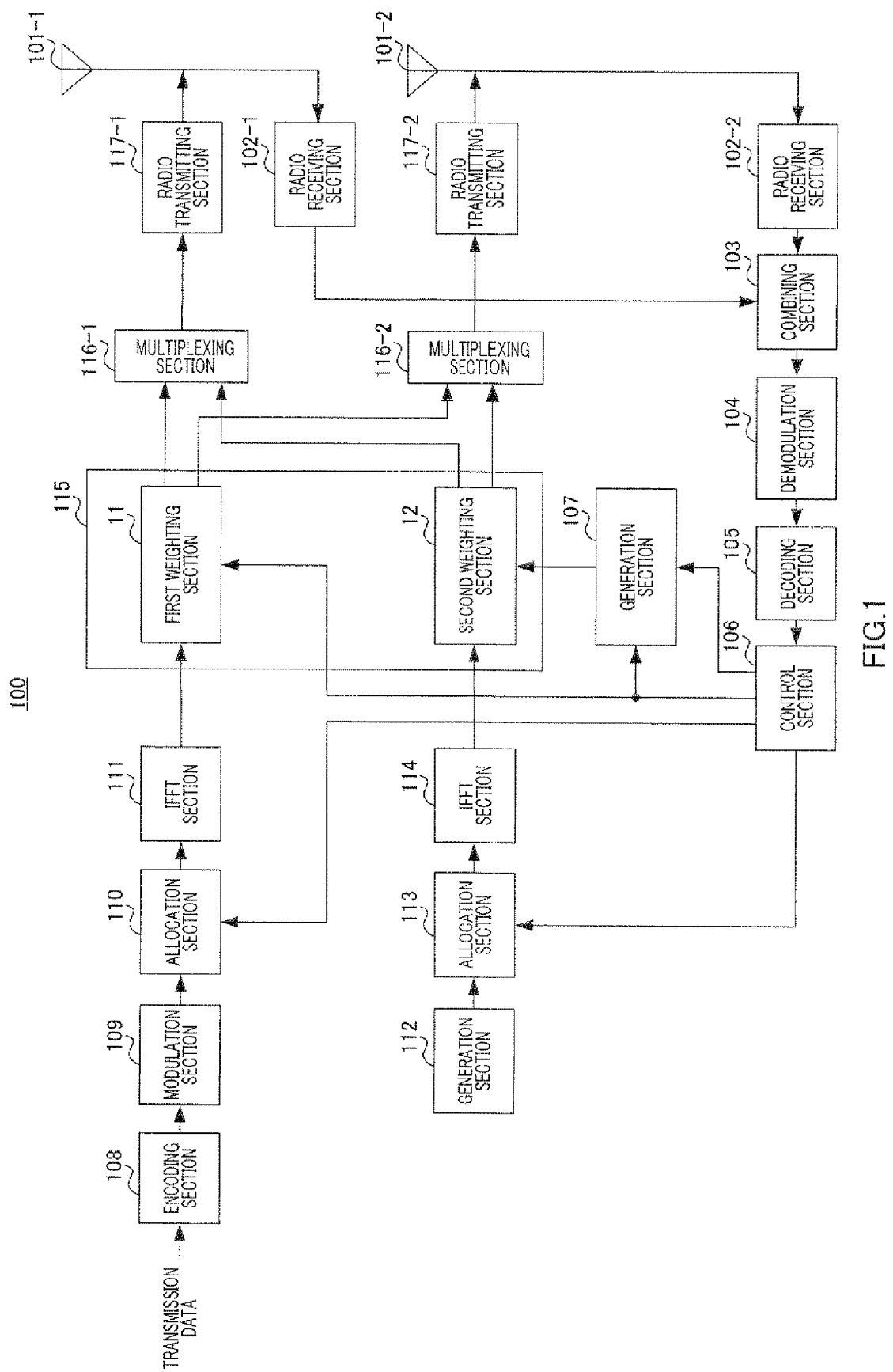
FIG. 1 is a block diagram showing a configuration of a mobile station according to Embodiment 1 of the present invention.

The configuration of mobile station 100 according to Embodiment 1 of the present invention is shown in FIG. 1.

Mobile station 100 shown in FIG. 1 is provided with two antennas: antenna 101-1 and antenna 101-2, Radio receiving section 102-1, multiplexing section 116-1, and radio transmitting section 117-1 are provided for antenna 101-1, and radio receiving section 102-2, multiplexing section 116-2, and radio transmitting section 117-2 are provided for antenna 101-2.

In mobile station 100 shown in FIG. 1, radio receiving section 102-1 and radio receiving section 102-2 receive control information transmitted from a base station via antenna 101-1 and antenna 101-2 respectively, and perform reception processing such as down-conversion and A/D conversion on this control information. Radio receiving section 102-1 and radio receiving section 102-2 output control information that has undergone reception processing to combining section 103.

This control information includes an MCS used for transmission data (uplink data), SRS time/frequency resource allocation information indicating a time resource and frequency resource to which an SRS is allocated, RB (resource block) allocation information indicating a resource block to which transmission data is allocated, and precoding vector information indicating a precoding matrix (hereinafter referred to as "precoding matrix $\phi$") used for transmission data weighting. SRS time/frequency resource allocation information shows a main SRS channel to which an SRS with a smaller transmission interval (for example, an SRS necessary for CQI updating) is allocated, and a sub SRS channel to which an SRS with a greater transmission interval (for example, an SRS necessary for precoding matrix $\phi$ and RANK number updating) is allocated.

Combining section 103 combines control information input from radio receiving section 102-1 and radio receiving section 102-2, using Maximum Ratio Combining (MRC), for example. Then combining section 103 outputs the combined control information to demodulation section 104.

Demodulation section 104 demodulates the combined control information input from combining section 103, and outputs demodulated control information to decoding section 105.

Decoding section 105 decodes the demodulated control information input from demodulation section 104, and outputs decoded control information to control section 106.

Control section 106 outputs precoding matrix $\phi$ indicated by precoding vector information included in the control information to first weighting section 11 of weighting section 115, and generation section 107. Control section 106 also indicates a precoding matrix to be used for SRS weighting to generation section 107 based on SRS time/frequency resource allocation information included in the control information. Here, an interval for using a precoding matrix (hereinafter referred to as "precoding matrix $\phi_{inv}$") orthogonal to precoding matrix $\phi$ is controlled by control section 106 independently of an interval for using precoding matrix $\phi$. Specifically, control section 106 controls the interval for using precoding matrix $\phi$ according to an interval necessary for CQI updating, but controls the interval for using precoding matrix $\phi_{inv}$ according to an interval necessary for precoding matrix $\phi$ and RANK number updating. Also, control section 106 makes the interval for using precoding matrix $\phi_{inv}$ greater than the interval for using precoding matrix $\phi$. For example, when SRS time/frequency resource allocation information indicates a main SRS channel, control section 106 directs generation section 107 not to generate precoding matrix $\phi_{inv}$ orthogonal to precoding matrix $\phi$. On the other hand, when SRS time/frequency resource allocation information indicates a sub SRS channel, control section 106 directs generation section 107 to generate precoding matrix $\phi_{inv}$.

Control section 106 also outputs an MCS included in the control information to encoding section 108 and modulation section 109 (not shown). Furthermore, control section 106 outputs RB allocation information included in the control information to allocation section 110. In addition, control section 106 outputs SRS time/frequency resource allocation information included in the control information to allocation section 113.

If directed by control section 106 not to generate precoding matrix $\phi_{inv}$ orthogonal to precoding matrix $\phi$, generation section 107 outputs precoding matrix $\phi$ input from control section 106 directly to second weighting section 12 of weighting section 115. On the other hand, if directed by control section 106 to generate a precoding matrix orthogonal to precoding matrix $\phi$, generation section 107 generates precoding matrix $\phi_{inv}$ orthogonal to the precoding matrix input from control section 106. Then generation section 107 outputs generated precoding matrix $\phi_{inv}$ to second weighting section 12 of weighting section 115.

Encoding section 108 encodes transmission data in accordance with the MCS input from control section 106 (not shown), and outputs encoded transmission data to modulation section 109.

Modulation section 109 modulates the encoded transmission data in accordance with the MCS input from control section 106 (not shown), and outputs modulated transmission data to allocation section 110.

Allocation section 110 allocates the modulated transmission data input from modulation section 109 to an RB based on RB allocation information input from control section 106. Then allocation section 110 outputs transmission data allocated to an RB to IFFT section 111.

IFFT section 111 executes IFFT processing on a subcarrier composing an RB to which transmission data input from allocation section 110 has been allocated, and outputs post-IFFT transmission data to weighting section 115.

Meanwhile, generation section 112 generates an SRS using a known sequence decided beforehand between the base station and mobile station 100. Generation section 112 outputs the generated SRS to allocation section 113.

Allocation section 113 allocates the SRS input from generation section 112 to a frequency resource based on SRS time/frequency resource allocation information input from control section 106. Then allocation section 113 outputs the SRS allocated to a frequency resource to IFFT section 114.

IFFT section 114 executes IFFT processing on a subcarrier composing a frequency resource to which the SRS input from allocation section 113 has been allocated, and outputs the post-IFFT SRS to weighting section 115.

Using precoding matrix $\phi$ and precoding matrix $\phi_{inv}$, weighting section 115 weights transmission data input from IFFT section 111 and an SRS input from IFFT section 114. Here, weighting section 115 is provided with first weighting section 11 and second weighting section 12. First weighting section 11 weights transmission data using precoding matrix $\phi$ input from control section 106, while second weighting section 12 weights an SRS using precoding matrix $\phi$ and precoding matrix $\phi_{inv}$ input from generation section 107. Then weighting section 115 outputs transmission data and an SRS allocated to antenna 101-1 to multiplexing section 116-1, and outputs transmission data and an SRS allocated to antenna 101-2 to multiplexing section 116-2.

Multiplexing section 116-1 and multiplexing section 116-2 perform time multiplexing of transmission data and an SRS input from weighting section 115, and output multiplexed signals to radio transmitting section 117-1 and radio transmitting section 117-2.

Radio transmitting section 117-1 and radio transmitting section 117-2 perform transmission processing such as D/A conversion, amplification, and up-conversion on signals input from multiplexing section 116-1 and multiplexing section 116-2 respectively, and simultaneously transmit post-transmission-processing signals from antenna 101-1 and antenna 101-2.

At the base station, when an SRS is received from mobile station 100, an effective channel, which is a channel resulting from multiplying an actual channel by precoding matrix $\phi$ or precoding matrix $\phi_{inv}$, is estimated. Then the base station uses the estimated effective channel to update a CQI, precoding matrix, and RANK number. Specifically, when the base station receives an SRS weighted using precoding matrix $\phi$ used for transmission data weighting (an SRS allocated to a main SRS channel), the base station updates a CQI in order to select an MCS of the next communication of mobile station 100. The base station also performs frequency scheduling and uplink data transmission timing control using an SRS weighted using precoding matrix $\phi$. For example, for an SRS weighted using precoding matrix $\phi$, the base station performs frequency scheduling by estimating a frequency domain characteristic, and performs transmission timing control by estimating time domain timing. On the other hand, when the base station receives an SRS weighted using precoding matrix $\phi_{inv}$ orthogonal to precoding matrix $\phi$ used for transmission data weighting (an SRS allocated to a sub SRS channel), the base station updates precoding matrix $\phi$ and a RANK number. Specifically, the base station updates precoding matrix $\phi$ and a RANK number by using both a previously received SRS weighted using precoding matrix $\phi$ and an SRS weighted using precoding matrix $\phi_{inv}$. Then the base station reports the MCS, precoding matrix $\phi$, and the RANK number to the mobile station.

Next, an example of SRS transmission according to this embodiment will be described. Here, mobile station 100 (FIG. 1) is provided with two antennas, while the base station is provided with four antennas. Also, a channel matrix indicating an actual channel state between the base station and mobile station 100 in subframe #n is designated H(n). If the number of antennas of the base station is designated k, and the number of antennas of mobile station 100 is 1, channel matrix H(n) is represented by a k×1 matrix. Here, H(n) is a 4×2 matrix. Also, a precoding matrix (precoding vector) used for weighting of transmission data set in subframe #n is designated $\phi(n)$, and a precoding matrix orthogonal to precoding matrix $\phi(n)$ is designated precoding matrix $\phi_{inv}(n)$. Here, since the mobile station is provided with two antennas, $\phi(n)$ and $\phi_{inv}(n)$ are 2×1 matrices.

First, the base station sets initial value $\phi(0)$ of a precoding matrix used for transmission data weighting by a mobile station. For example, on receiving an uplink data communication start request from mobile station 100, the base station allocates an SRS resource to each antenna of mobile station 100. For instance, the base station allocates a main SRS channel (for example, SRS channel 1) as an SRS resource for antenna 101-1 of mobile station 100, and allocates a sub SRS channel (for example, SRS channel 2) as an SRS resource for antenna 101-2 of mobile station 100. Here, SRS channel 1 and SRS channel 2 are defined periodically in the time domain. For example, SRS channel 1 is allocated to each subframe, and SRS channel 2 is allocated every 4 subframes. That is to say, the main SRS channel (SRS channel 1) is allocated at shorter time intervals than the sub SRS channel (SRS channel 2).

Then mobile station 100 transmits SRSs to the base station from antenna 101-1 and antenna 101-2 using the SRS resources allocated to the antennas, and the base station receives each SRS with its four antennas. The base station then obtains channel matrix H(0), a 4×2 matrix, indicating the channel states between the four antennas of the base station and the two antennas of mobile station 100—that is, the actual channel states. Then the base station sets precoding matrix φ(0) to be used for transmission data weighting by mobile station 100 in accordance with channel matrix H(0).

In this way, initial value φ(0) of a precoding matrix used by a mobile station for transmission data weighting is set by the base station. Furthermore, in accordance with channel matrix H(0), the base station decides a RANK number (space multiplexing number), a frequency resource to which an SRS is allocated, an RB to which transmission data is allocated, and a CQI predicted when precoding matrix φ(0) is used (that is, a CQI in effective channel H(0)φ(0)).

The base station then sends mobile station 100 control information including the MCS to be used for transmission data, SRS time/frequency resource allocation information indicating a time resource and frequency resource to which an SRS is allocated, RB allocation information indicating an RB to which transmission data is allocated, and precoding vector information indicating precoding matrix φ(0). The base station sends control information using a physical channel such as a PDCCH (Physical Downlink Control Channel), for example. Provision may also be made for a plurality of candidate precoding matrices φ to be defined beforehand between the base station and a mobile station, and for the base station to send mobile station 100 only an index indicating precoding matrix φ(0).

On being notified of precoding matrix φ(0) by the base station, mobile station 100 performs transmission data and SRS weighting as described above, using precoding matrix φ(0) and precoding matrix $\phi_{inv}(0)$ orthogonal to precoding matrix φ(0). Then mobile station 100 transmits the weighted transmission data and SRSs to the base station. As with precoding matrix φ(0), a plurality of candidate precoding matrices $\phi_{inv}$ may be defined beforehand between the base station and a mobile station. In this case, mobile station 100 reports precoding matrix $\phi_{inv}(0)$ used by itself via a known uplink control channel. Provision may also be made for a combination of a certain precoding matrix φ(0) and precoding matrix $\phi_{inv}(0)$ orthogonal to that precoding matrix φ(0) to be defined beforehand on a one-to-one basis between the base station and mobile station 100. In this case, it is not necessary for the base station to be notified of $\phi_{inv}(0)$ by mobile station 100.

Here, an SRS weighted using precoding matrix φ(0) is designated SRS1, and an SRS weighted using precoding matrix $\phi_{inv}(0)$ is designated SRS2. Also, of the uplink resources, SRS1 is allocated to a main SRS channel (SRS channel 1), and SRS2 is allocated to a sub SRS channel (SRS channel 2).

As stated above, it is necessary for the base station to receive an SRS from mobile station 100 in order to perform precoding matrix φ(n), RANK number, and CQI updating.

Here, the same effective channel H(0)φ(0) as for transmission data should be obtained by the base station in order to update a CQI for selecting an optimum MCS for transmission data. Effective channel H(0)φ(0) is represented here by a k×r matrix, where r indicates a RANK number. The base station can obtain effective channel H(0)φ(0) by receiving SRS1 weighted using precoding matrix φ(0) used for transmission data weighting. That is to say, mobile station 100 should transmit SRS1 in order for a CQI to be updated by the base station.

On the other hand, it is necessary for the base station to obtain channel matrix H(n) indicating an actual channel state in order to perform precoding matrix φ(n) and RANK number updating. However, when SRS1 is transmitted from mobile station 100, it appears to the base station to have been received via effective channel H(n)φ(0). Consequently, in order for the base station to perform precoding matrix φ(n) and RANK number updating, it is also necessary for the base station to receive SRS2 for which precoding matrix $\phi_{inv}(0)$ orthogonal to precoding matrix φ(0) was used.

For instance, if precoding matrix φ(0) is assumed to be $(1,1)^T$, precoding matrix $\phi_{inv}(0)$ orthogonal to precoding matrix φ(0) is $(1,-1)^T$, for example, where superscript T represents transposition.

When SRS1 weighted using precoding matrix φ(0) is transmitted, effective channel H(n)φ(0) is obtained by the base station. Similarly, when SRS2 weighted using precoding matrix $\phi_{inv}(0)$ is transmitted, effective channel H(n)$\phi_{inv}(0)$ is obtained by the base station. By this means, the base station can calculate a post-precoding channel matrix with vectors indicated by effective channel H(n)φ(0) and effective channel H(n)$\phi_{inv}(0)$ as components. Specifically, a post-precoding channel matrix is represented by H(n)Φ(0)={H(n)φ(0), H(n)$\phi_{inv}(0)$}, where Φ(0) is {φ(0), $\phi_{inv}(0)$}. That is to say, Φ(0) is represented by equation 1 below.

$$\Phi(0) = \begin{pmatrix} 1 & 1 \\ 1 & -1 \end{pmatrix} \quad \text{(Equation 1)}$$

Since φ(0) and $\phi_{inv}(0)$ are mutually orthogonal, inverse matrix $\Phi^{-1}(0)$ of Φ(0) necessarily exists. That is to say, inverse matrix $\Phi^{-1}(0)$ of Φ(0) shown in equation 1 is represented by equation 2 below.

$$\Phi^{-1}(0) = \begin{pmatrix} \frac{1}{2} & \frac{1}{2} \\ \frac{1}{2} & -\frac{1}{2} \end{pmatrix} \quad \text{(Equation 2)}$$

Thus, the base station can calculate channel matrix H(n) indicating an actual channel state by multiplying post-precoding channel matrix H(n)Φ(0) by $\Phi^{-1}(0)$, as shown in equation 3 below. The base station performs precoding matrix Φ(n) and RANK number updating using calculated H(n).

$$H(n) = H(n) \cdot \Phi(0) \cdot \Phi^{-1}(0) \quad \text{(Equation 3)}$$

In this way, SRS1 and SRS2 for performing precoding matrix φ(n), RANK number, and CQI optimization according to a momentary fluctuating channel state are transmitted. Also, as explained above, SRS1 weighted using precoding matrix φ(0) that is used for transmission data weighting should be transmitted at an interval necessary for CQI updating. On the other hand, SRS2 weighted using precoding matrix $\phi_{inv}(0)$ orthogonal to precoding matrix φ(0) should be transmitted at an interval necessary for precoding matrix φ(0) and RANK updating. That is to say, since the purposes for which SRS1 and SRS2 are used by the base station are different, mobile station 100 should transmit SRS1 and SRS2 respectively at requested transmission intervals. That is, mobile station 100 should use precoding matrix φ(0) and precoding matrix $\phi_{inv}(0)$ at intervals at which they are respectively requested.

Also, in order for mobile station 100 to use an optimum MCS, it is necessary for the base station to perform frequent CQI updating according to a channel state. On the other hand, there is little effect on a radio communication system if the frequency of precoding matrix φ(0) and RANK number updating is lower than the CQI updating frequency. That is to say, there is little effect on a radio communication system if the transmission interval of SRS1 used for precoding matrix φ(n) and RANK number updating is greater than that of SRS1 used for CQI updating. In other words, there is little effect on a radio communication system if the interval for using precoding matrix $\phi_{inv}(0)$ is greater than the interval for using precoding matrix $\phi(0)$.

Thus, control section 106 of mobile station 100 according to this embodiment controls the interval for using precoding matrix $\phi(0)$ and the interval for using precoding matrix $\phi_{inv}(0)$ independently. At this time, control section 106 makes the interval for using precoding matrix $\phi_{inv}(0)$ greater than the interval for using precoding matrix $\phi(0)$.

Figure 2:
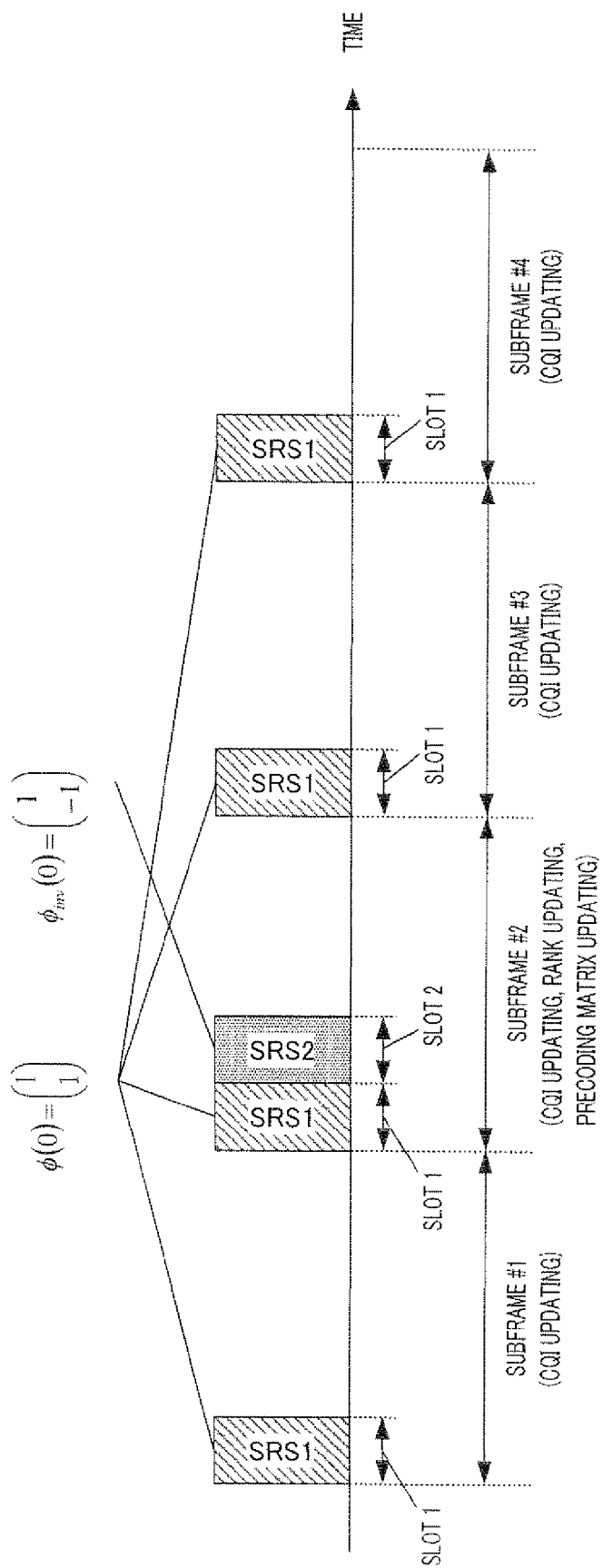
FIG. 2 is a drawing showing an example of SRS transmission according to Embodiment 1 of the present invention.

FIG. 2 is a drawing showing an example of SRS transmission by mobile station 100. Here, a main SRS channel (SRS channel 1) to which SRS1 is allocated is defined for each subframe, and a sub SRS channel (SRS channel 2) to which SRS2 is allocated is defined every 4 subframes.

That is to say, the interval for using precoding matrix $\phi(0)=(1,1)^T$ used for transmission data weighting is made "every subframe" by control section 106. Furthermore, the interval for using precoding matrix $\phi_{inv}(0)=(1,-1)^T$ orthogonal to precoding matrix $\phi(0)$ is made "every 4 subframes" by control section 106, independently of control of the interval for using precoding matrix $\phi(0)$. That is, control section 106 makes the interval for using precoding matrix $\phi_{inv}(0)$ greater than the interval for using precoding matrix $\phi(0)$.

Thus, for example, as shown in FIG. 2, in subframe #1 SRS1 is transmitted in slot 1. Also, in subframe #2, SRS1 is transmitted in slot 1 and SRS2 is transmitted in slot 2. Similarly, in subframe #3, SRS1 is transmitted in SRS1, and in subframe #4, SRS1 is transmitted in slot 1. As shown in FIG. 2, in subframes #1 through #4, the SRS2 transmission interval is greater than the SRS1 transmission interval. In other words, the placement density of SRS2 in subframes #1 through #4 shown in FIG. 2 is lower than the placement density of SRS1 in subframes #1 through #4.

By this means, since SRS1 weighted using precoding matrix $\phi(0)$ used for transmission data weighting is transmitted in every subframe, the base station can obtain effective channel $H(n)\phi(0)$ identical to the effective channel of subframe #n transmission data. Specifically, the base station can obtain effective channel $H(1)\phi(0)$, effective channel $H(2)\phi(0)$, effective channel $H(3)\phi(0)$, and effective channel $H(4)\phi(0)$ for each of subframes #1 through #4 shown in FIG. 2. Then the base station performs CQI updating for each subframe based on effective channel $H(n)\phi(0)$, and uses the updated CQIs to perform optimization of the MCS to be used by mobile station 100 in the next communication.

Also, as shown in FIG. 2, using subframe #2 in which SRS2 is transmitted, the base station calculates channel matrix $H(2)$ indicating an actual channel state as described above, and performs precoding matrix $\phi(2)$ and RANK number updating. Specifically, the base station obtains effective channel $H(2)\phi(0)$ from SRS1 received in slot 1 of subframe #2 shown in FIG. 2, and obtains effective channel $H(2)\phi_{inv}(0)$ from SRS2 received in slot 2. Then the base station calculates channel matrix $H(2)$ indicating an actual channel state as shown in equation 3. The base station then updates precoding matrix $\phi(0)$ with $\phi(2)$ using $H(2)$, and uses this in subframe #5 (not shown) onward, for example. At the same time, the base station also performs RANK number updating using $H(2)$.

Thus, mobile station 100 transmits SRS1 in all of subframes #1 through #4 shown in FIG. 2, but transmits SRS2 only in subframe #2. That is to say, the base station need not allocate a time resource and frequency resource for transmitting SRS2 to mobile station 100 in the three subframes other than subframe #2. By this means, a sub SRS channel (SRS channel 2) allocated to SRS2 can be eliminated in three sub frames—subframes #1, #3, and #4—shown in FIG. 2.

Thus, according to this embodiment, an interval for using precoding matrix $\phi_{inv}$ orthogonal to precoding matrix $\phi$ is controlled by control section 106 independently of an interval for using precoding matrix $\phi$. By this means, precoding matrix $\phi$ used for transmission data weighting is used at an interval necessary for CQI updating, and precoding matrix $\phi_{inv}$ orthogonal to precoding matrix $\phi$ is used at an interval necessary for precoding matrix $\phi$ and RANK number updating. By this means, the minimum necessary number of SRSs weighted using precoding matrix $\phi$ and precoding matrix $\phi_{inv}$ are transmitted. Consequently, SRS resources can be kept to a necessary minimum. Also, a mobile station makes an interval for using precoding matrix $\phi_{inv}$ greater than an interval for using precoding matrix $\phi$. Consequently, the transmission interval of an SRS weighted using precoding matrix $\phi_{inv}$ is greater than the transmission interval of an SRS weighted using precoding matrix $\phi$. Thus, an SRS resource allocated to an SRS weighted using precoding matrix $\phi_{inv}$ can be reduced. Therefore, according to this embodiment, an increase in SRS resources can be suppressed even when a mobile station is provided with a plurality of antennas.

Figure 3:
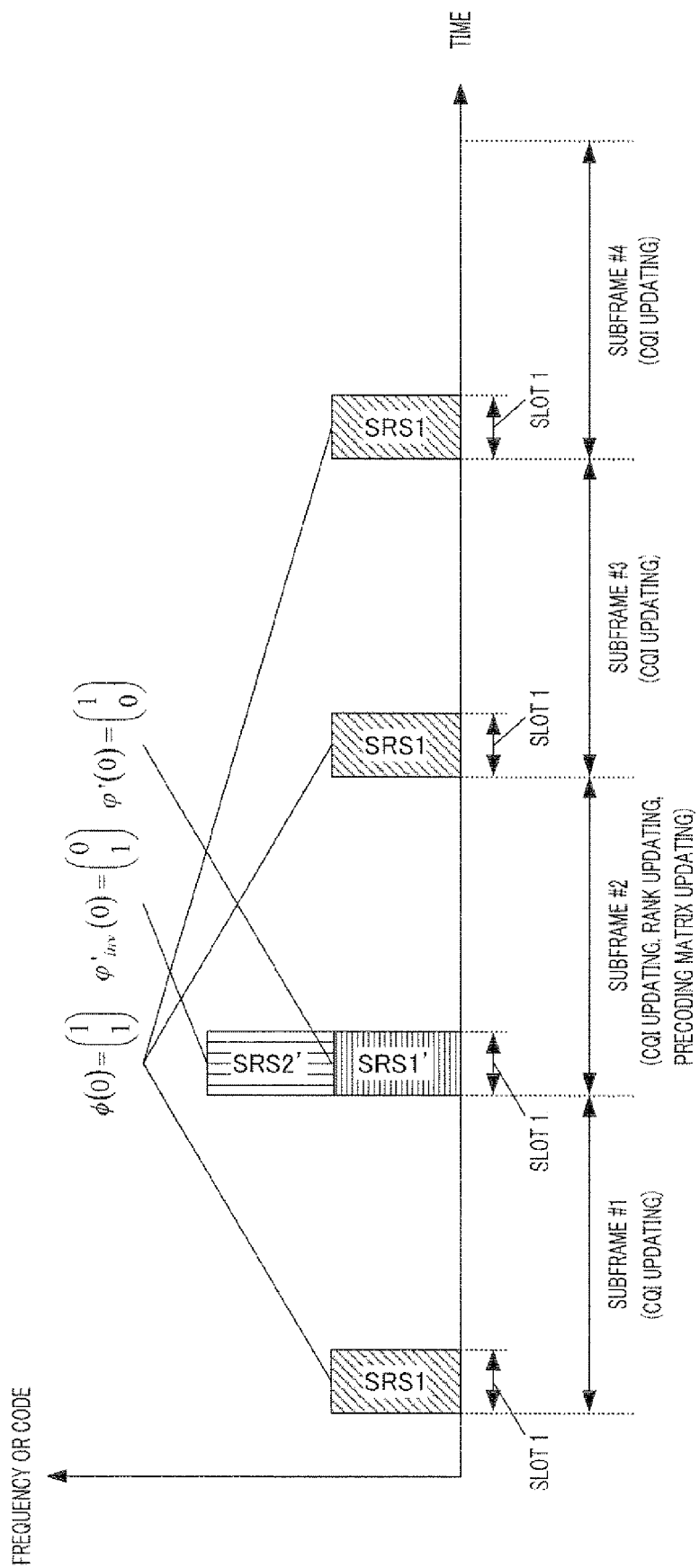
FIG. 3 is a drawing showing another example of SRS transmission of the present invention.

In this embodiment, a case has been described in which a mobile station transmits SRS1 and SRS2 in different slots (for example, slot 1 and slot 2 shown in FIG. 2) using precoding matrices $\phi(0)$ and $\phi_{inv}(0)$ in subframe #2, and a base station finds channel matrix H. However, with the present invention, a subframe #2 SRS transmitting method and precoding matrices are not limited to this case. For example, a method may be used, as shown in FIG. 3, whereby a mobile station secures a number of resources equivalent to its number of antennas using two resources that are mutually orthogonal in a domain other than the time domain (for example, in the frequency domain, the code domain, or the like) in slot 1 of subframe #2. In this case, also, two SRS resources are secured within one subframe, as in FIG. 2. Thus, confirmation of channel matrix H by the base station is possible as long as the mobile station transmits two SRSs (for example, SRS1' and SRS2') using two mutually orthogonal precoding matrices. Also, precoding matrices for SRS1' and SRS2' transmitted at the same time in slot 1 of subframe #2 may be set, for example, as $\phi'(0)=(1,0)^T$ and $\phi'_{inv}(0)=(0,1)^T$, as shown in FIG. 3. Setting precoding matrices in this way makes it possible to prevent a plurality of SRSs (SRS1' and SRS2') having different waveforms from being transmitted at the same time from the antennas of the mobile station. Generally, an SRS transmission waveform is designed so that the PAPR (Peak to Average Power Ratio) is low, and using precoding matrices $\phi'(0)$ and $\phi'_{inv}(0)$ shown in FIG. 3 also has an effect of enabling the per-antenna PAPR to be kept low for an SRS transmission waveform.

Figure 4:
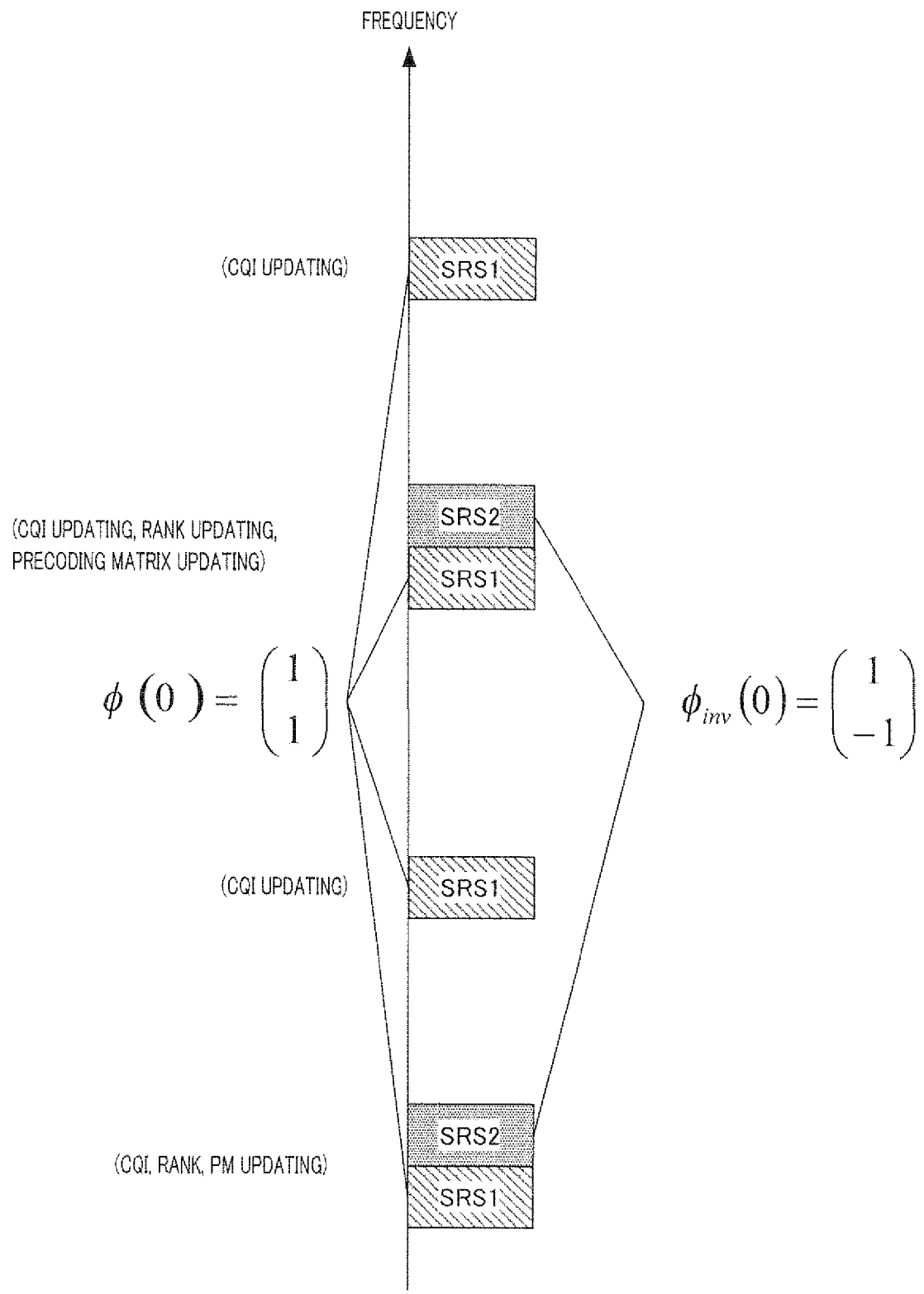
FIG. 4 is a drawing showing another example of SRS transmission of the present invention (in the case of the frequency domain)

In this embodiment, a case has been described in which an interval for using precoding matrix $\phi$ and an interval for using precoding matrix $\phi_{inv}$ are intervals for use in the time domain. However, with the present invention, an interval for using precoding matrix $\phi$ and an interval for using precoding matrix $\phi_{inv}$ may also be intervals for use in the frequency domain. Here, frequency selectivity of optimal values of precoding matrix $\phi$ and a RANK number is smaller than frequency selectivity of an optimal value of a CQI. Thus, control section 106 may also make an interval for using precoding matrix $\phi_{inv}$ greater than an interval for using precoding matrix $\phi$ in the frequency domain. For example, in the frequency domain shown in FIG. 4, control section 106 makes the interval for using precoding matrix $\phi_{inv}(0)$—that is, the SRS2 placement interval—greater than the interval for using precoding matrix $\phi(0)$—that is, the SRS1 placement interval. That is to say, as shown in FIG. 4, SRS2 placement density is lower than SRS1 placement density in the same frequency band. By this means, an increase in SRS resources in the frequency domain can be suppressed.

Figure 5:
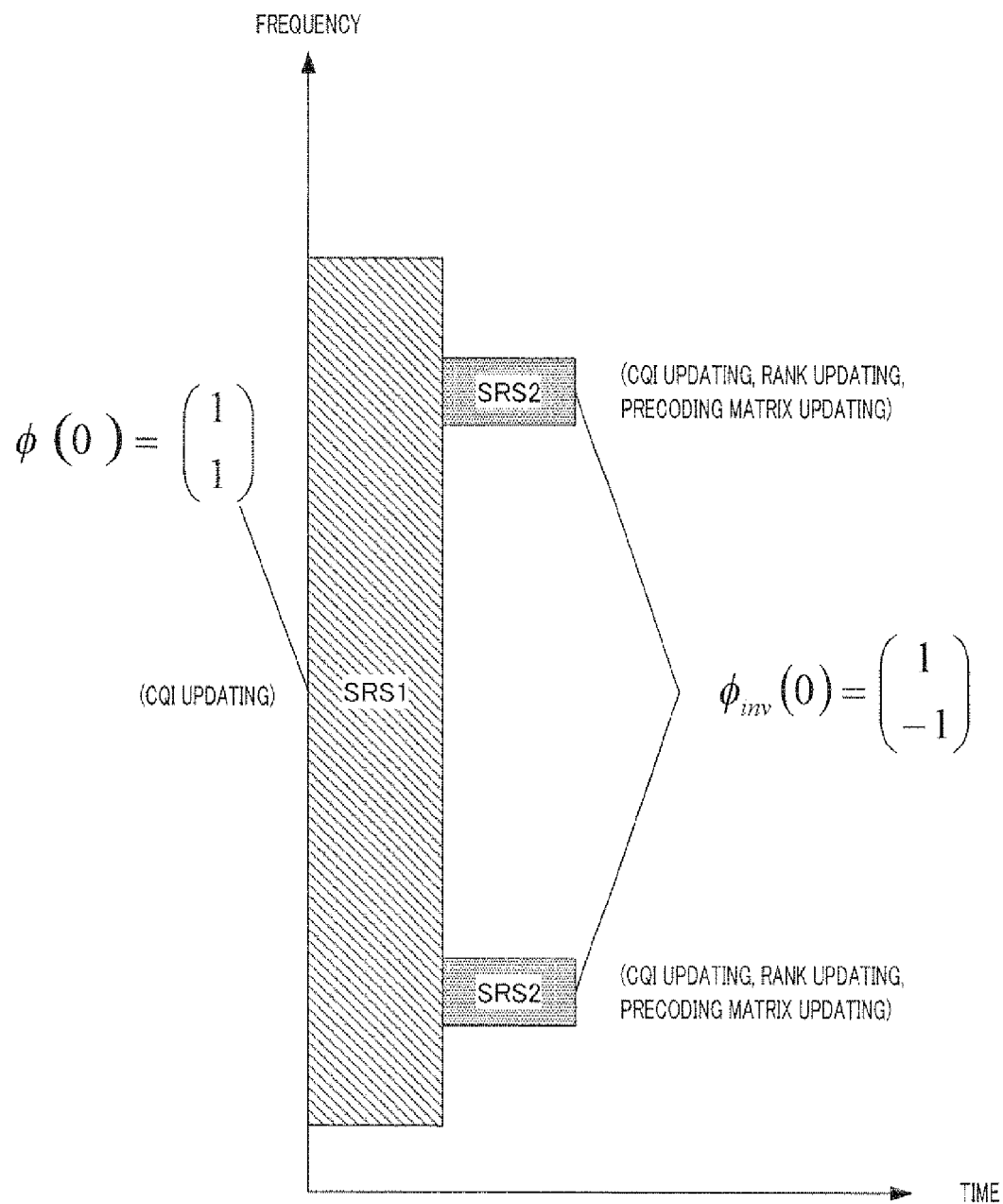
FIG. 5 is a drawing showing another example of SRS transmission of the present invention (in the case of the frequency domain)

Furthermore, as shown in FIG. 5, SRS1 (using precoding matrix φ(0)) allocated across an entire frequency band to which SRS allocation is performed may be transmitted at a certain time, while SRS2 (using precoding matrix $\phi_{inv}(0)$) allocated to part of the entire band is transmitted at a different time from SRS1. That is to say, by making SRS2 placement density lower than SRS1 placement density in the same frequency domain, as in FIG. 4, a mobile station can suppress an increase in SRS resources in the frequency domain.

Figure 6:
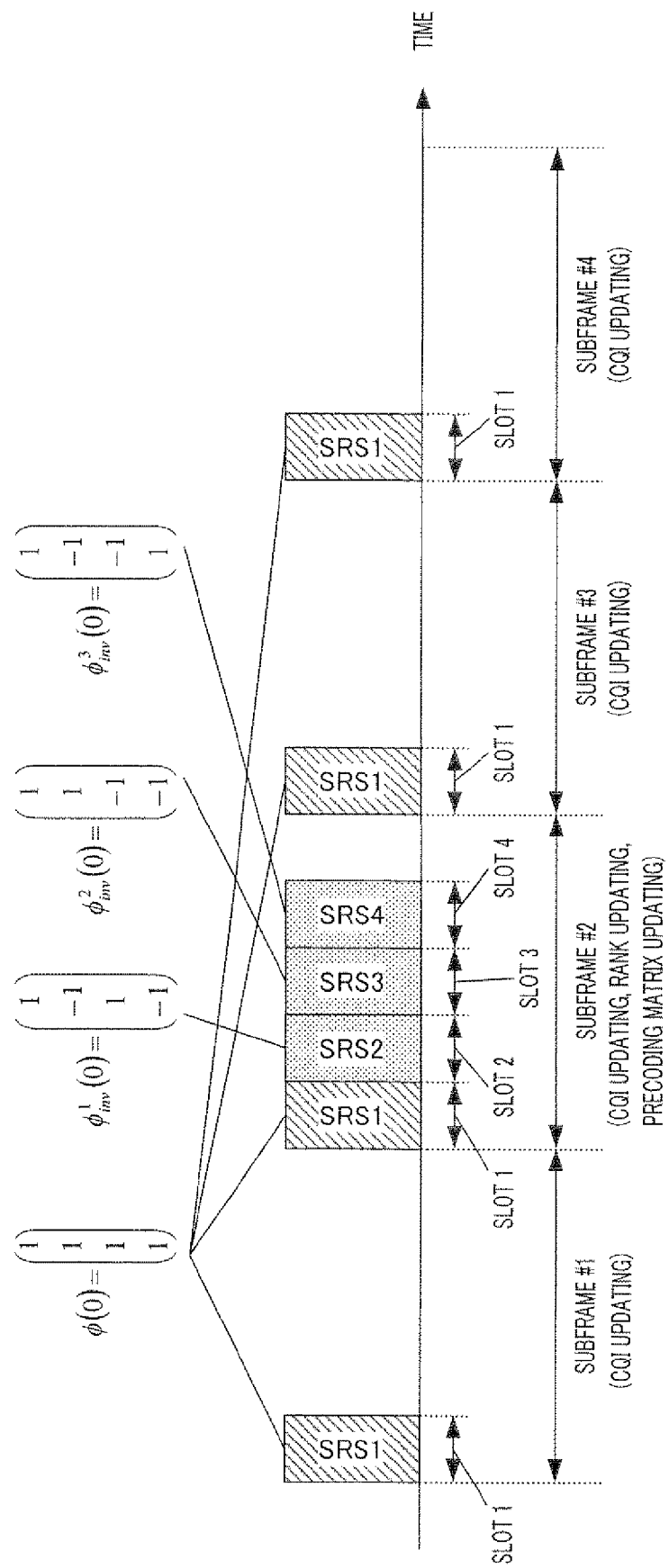
FIG. 6 is a drawing showing an example of SRS transmission according to Embodiment 1 of the present invention (when the number of antennas is 4)

In this embodiment, a case has been described in which mobile station 100 is provided with two antennas. However, with the present invention, the number of antennas with which mobile station 100 is provided may also be three or more. When mobile station 100 is provided with m antennas, precoding matrix φ(0) is represented as an m×1 matrix (vector). Also, in order for channel matrix H(n) indicating an actual channel state to be obtained by a base station, it is necessary for the base station to receive m mutually orthogonal SRSs. That is to say, for precoding matrix φ(0), (m−1) mutually orthogonal precoding matrices $\phi_{inv}^1(0)$, $\phi_{inv}^2(0)$, ..., $\phi_{inv}^{m-1}(0)$ are necessary. An example of SRS transmission when mobile station 100 is provided with four antennas (when m=4) is shown in FIG. 6. Here, the RANK number (space multiplexing number) is assumed to be 1, as in Embodiment 1. As shown in FIG. 6, SRS1 weighted using precoding matrix $\phi(0)=(1, 1, 1, 1)^T$ is transmitted in each subframe. On the other hand, SRS2, SRS3, and SRS4 weighted using respectively $\phi_{inv}^1(0)=(1, -1, 1, -1)^T$, $\phi_{inv}^2(0)=(1, 1, -1, -1)^T$, and $\phi_{inv}^3(0)=(1, -1, -1, 1)^T$ mutually orthogonal to precoding matrix φ(0) are transmitted in subframe #2. That is to say, as in this embodiment, the transmission interval of SRS2 through SRS4 is greater than the transmission interval of SRS1. That is, the interval for using precoding matrices $\phi_{inv}^1(0), \phi_{inv}^2(0), \ldots, \phi_{inv}^{m-1}(0)$ is greater than the interval for using precoding matrix φ(0). Consequently, as in this embodiment, SRS resources to which SRS2, SRS3, and SRS4 are allocated are unnecessary in sub frames #1, #3, and #4. Thus, the same kind of effect as in this embodiment can also be obtained when a mobile station is provided with two or more antennas.

Figure 7:
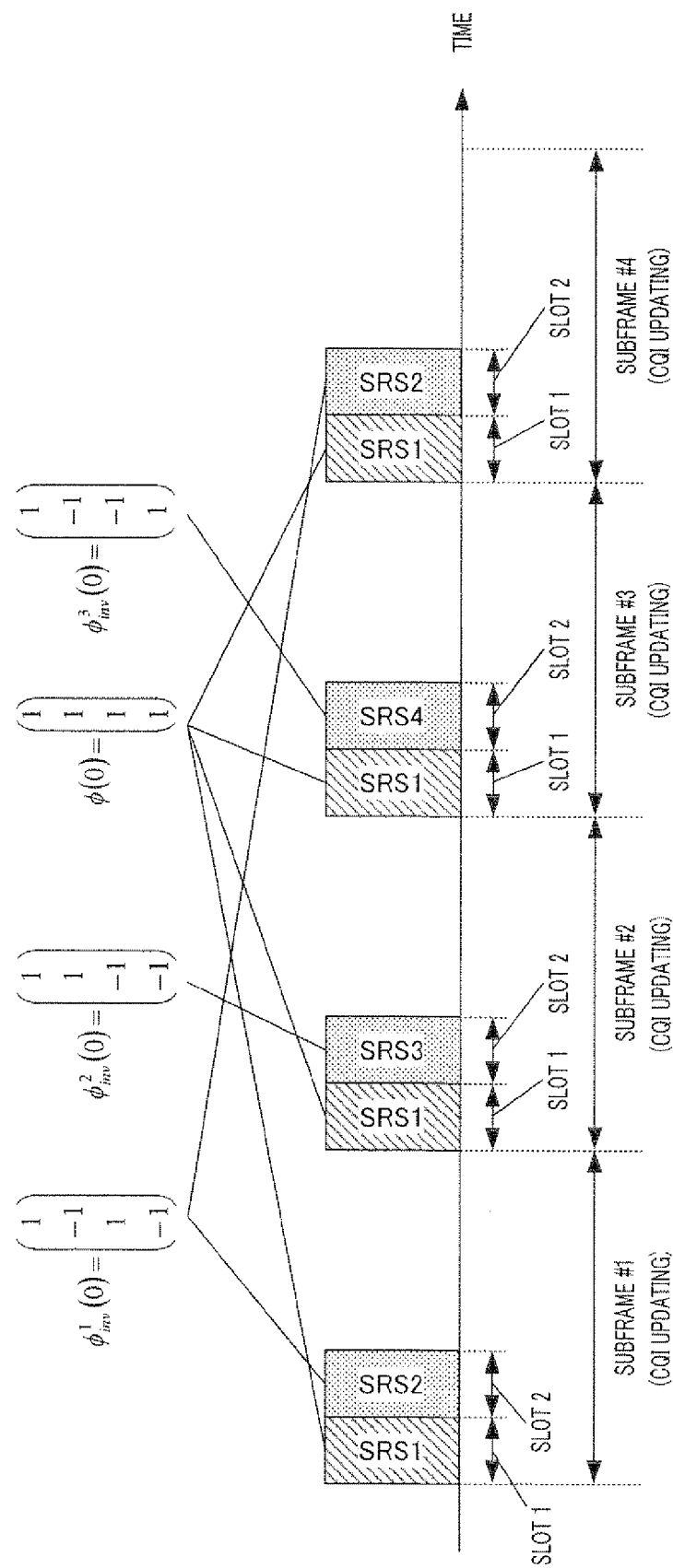
FIG. 7 is a drawing showing an example of SRS transmission according to Embodiment 1 of the present invention (when the number of antennas is 4)

Furthermore, when mobile station 100 is provided with four antennas (when m=4), provision may be made, as shown in FIG. 7, for SRS2 weighted using precoding matrix $\phi_{inv}^1(0)$ to be transmitted in subframe #1, for SRS3 weighted using $\phi_{inv}^2(0)$ to be transmitted in subframe #2, for SRS4 weighted using $\phi_{inv}^3(0)$ to be transmitted in subframe #3, and for SRS2 weighted using precoding matrix $\phi_{inv}^1(0)$ to be transmitted again in subframe #4. That is to say, each of precoding matrices $\phi_{inv}$ orthogonal to precoding matrix φ is transmitted in a different subframe every 3 subframes. As shown in FIG. 7, the interval (3 subframes) for using precoding matrices $\phi_{inv}^1(0)$, $\phi_{inv}^2(0)$, and $\phi_{inv}^3(0)$ orthogonal to precoding matrix φ(0) is greater than the interval (1 subframe) for using precoding matrix $\phi_{inv}(0)$, and therefore the same kind of effect can be obtained as in this embodiment. Moreover, comparing the example of SRS transmission shown in FIG. 7 with the example of SRS transmission shown in FIG. 6, two SRSs are allocated to each subframe in FIG. 7 while SRS1 through SRS4 are allocated to subframe #2 in FIG. 6. Thus, the amount of SRS resource allocation in each subframe in the time domain can be made uniform in the case illustrated in FIG. 7.

(Embodiment 2)

In this embodiment, a case in which the RANK number is 2 or more is described. That is to say, a mobile station space-multiplexes two or more different transmission data and transmits these to a base station.

Mobile station 100 according to this embodiment will now be described. In the following description, a case is described in which a base station is provided with four antennas, and mobile station 100 of Embodiment 1 (FIG. 1) is provided with four antennas. That is to say, mobile station 100 according to this embodiment is provided with four antennas 101 shown in FIG. 1 (for example, antennas 101-1 through 101-4). Also, the RANK number (space multiplexing number) is assumed to be 2. The base station notifies mobile station 100 of the RANK number, and also notifies mobile station 100 of a precoding matrix (precoding vector) used for each space-multiplexed transmission data (stream). In the following description, precoding matrices reported to a mobile station are designated $\phi^1(0)$ and $\phi^2(0)$. Here, since mobile station 100 is provided with four antennas, precoding matrices $\phi^1(0)$ and $\phi^2(0)$ are represented as 4×1 matrices. Precoding matrices $\phi^1(0)$ and $\phi^2(0)$ used for the respective transmission data (streams) are mutually orthogonal.

In mobile station 100 according to this embodiment, radio receiving section 102, multiplexing section 116, and radio transmitting section 117 are provided for each of the four antennas 101. Since the RANK number is 2, the number of encoding sections 108, modulation sections 109, allocation sections 110, and IFFT sections 111 provided corresponds to the RANK number—that is, the number of space-multiplexed transmission data (streams).

In a similar way to Embodiment 1, control section 106 controls an interval for using a plurality of precoding matrices $\phi_{inv}$ orthogonal to all of a plurality of precoding matrices φ independently of an interval for using the mutually orthogonal plurality of precoding matrices φ reported from the base station. At this time, as in Embodiment 1, control section 106 makes the interval for using the plurality of precoding matrices $\phi_{inv}$ greater than the interval for using the plurality of precoding matrices φ.

A plurality of precoding matrices φ are input to generation section 107 from control section 106. Then, when directed by control section 106 to generate a precoding matrix orthogonal to the plurality of precoding matrices φ, generation section 107 generates a plurality of precoding matrices $\phi_{inv}$ orthogonal to all of the plurality of precoding matrices φ. Specifically, generation section 107 generates quantity (number of antennas—RANK number) of precoding matrices $\phi_{inv}$ orthogonal to all of the plurality of precoding matrices φ equivalent to the RANK number input from control section 106. That is to say, generation section 107 generates two (=4−2) precoding matrices $\phi_{inv}$ (precoding matrices $\phi_{inv}^1(0)$ and $\phi_{inv}^2(0)$) orthogonal to both precoding matrices $\phi^1(0)$ and $\phi^2(0)$. Precoding matrices $\phi_{inv}^1(0)$ and $\phi_{inv}^2(0)$ are mutually orthogonal.

Weighting section 115 weights a plurality of transmission data (streams) and a plurality of SRSs using a plurality of precoding matrices φ (here, $\phi^1(0)$ and $\phi^2(0)$) and a plurality of precoding matrices $\phi_{inv}$ (here, $\phi_{inv}^1(0)$ and $\phi_{inv}^2(0)$).

Figure 8:
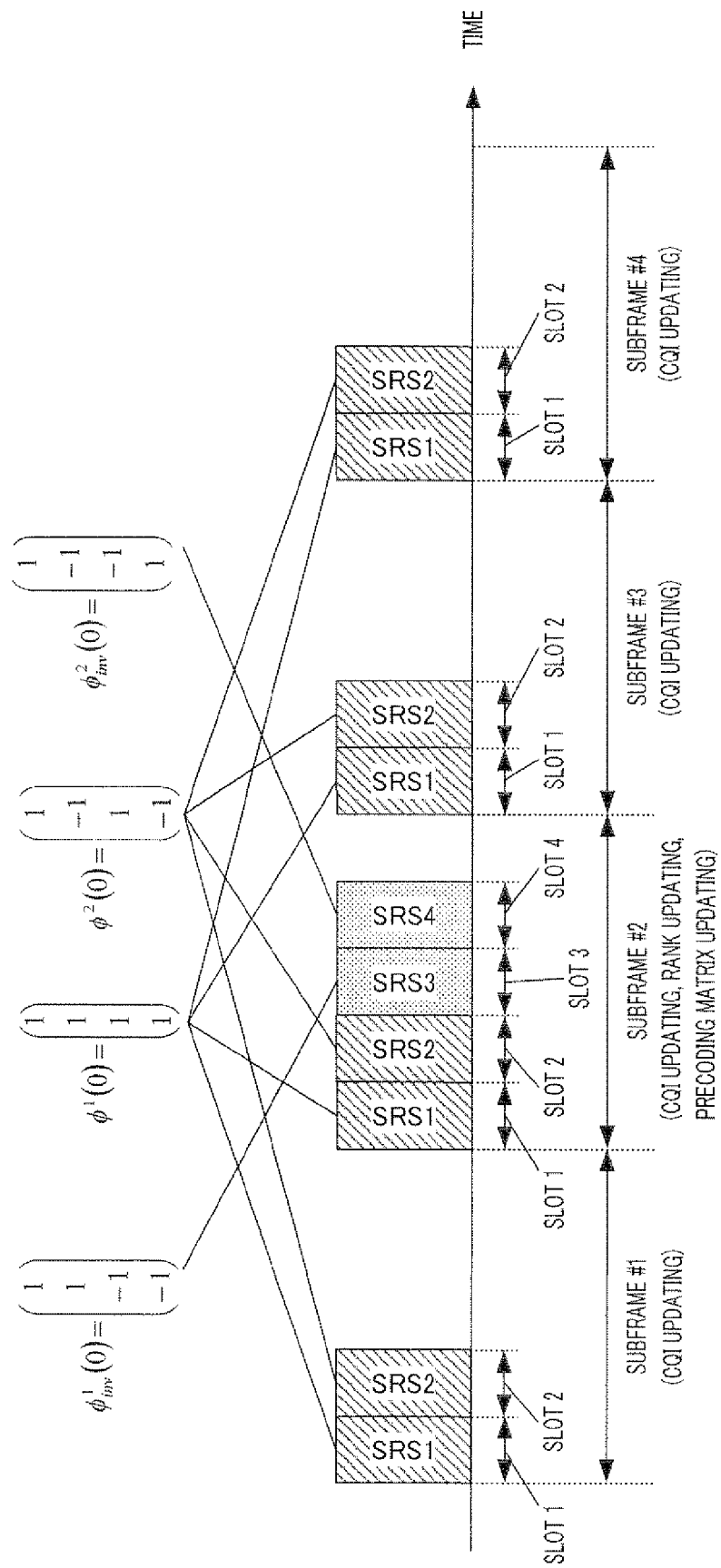
FIG. 8 is a drawing showing an example of SRS transmission according to Embodiment 2 of the present invention.

FIG. 8 shows an example of SRS transmission by mobile station 100. As shown in FIG. 8, precoding matrices $\phi^1(0)=(1, 1, 1, 1)^T$ and $\phi^2(0)=(1, -1, 1, -1)^T$ are mutually orthogonal. Also, precoding matrices $\phi_{inv}^1(0)=(1, 1, -1, -1)^T$ and $\phi_{inv}^2(0)=(1, -1, -1, 1)^T$ are each mutually orthogonal to both precoding matrices $\phi^1(0)$ and $\phi^2(0)$. Furthermore, precoding matrices $\phi_{inv}^1(0)$ and $\phi_{inv}^2(0)$ are mutually orthogonal. As shown in FIG. 8, an SRS weighted using precoding matrix $\phi^1(0)$ is designated SRS1, an SRS weighted using precoding matrix $\phi^2(0)$ is designated SRS2, an SRS weighted using precoding matrix $\phi_{inv}^1(0)$ is designated SRS3, and an SRS weighted using precoding matrix $\phi_{inv}^2(0)$ is designated SRS4. Also, of the uplink resources, SRS1 and SRS2 are allocated to a main SRS channel, and SRS3 and SRS4 are allocated to a sub SRS channel. As in Embodiment 1, a main SRS channel is defined for each subframe, and a sub SRS channel is defined for every 4 subframes.

That is to say, in a similar way to Embodiment 1, the interval for using precoding matrices $\phi^1(0)$ and $\phi^2(0)$ used for transmission data weighting is made "every subframe" by control section 106. Furthermore, the interval for using precoding matrices $\phi_{inv}^1(0)$ and $\phi_{inv}^2(0)$ orthogonal to both precoding matrices $\phi^1(0)$ and $\phi^2(0)$ is made "every 4 subframes" by control section 106, independently of control of the interval for using precoding matrices $\phi^1(0)$ and $\phi^2(0)$. That is, control section 106 makes the interval for using precoding matrices $\phi_{inv}^1(0)$ and $\phi_{inv}^2(0)$ greater than the interval for using precoding matrices $\phi^1(0)$ and $\phi^2(0)$.

Thus, for example, as shown in FIG. 8, in subframe #1 SRS1 is transmitted in slot 1, and SRS2 is transmitted in slot 2. Also, in subframe #2, SRS1 is transmitted in slot 1, SRS2 is transmitted in slot 2, SRS3 is transmitted in slot 3, and SRS4 is transmitted in slot 4. Similarly, in subframe #3 and subframe #4, SRS1 is transmitted in SRS1 and SRS2 is transmitted in slot 2. As shown in FIG. 8, in a similar way to Embodiment 1 (FIG. 2), in subframes #1 through #4, the transmission interval of SRS3 and SRS4 is greater than the transmission interval of SRS1 and SRS2. In other words, the placement density of SRS3 and SRS4 in subframes #1 through #4 shown in FIG. 8 is lower than the placement density of SRS1 and SRS2 in subframes #1 through #4.

By this means, in a similar way to Embodiment 1, SRS1 and SRS2 weighted using precoding matrices $\phi^1(0)$ and $\phi^2(0)$ used for transmission data weighting are transmitted in every subframe. Consequently, the base station can obtain effective channels $H(n)\phi^1(0)$ and $H(n)\phi^2(0)$ identical to the effective channels for each stream of subframe #n transmission data. Thus, the base station performs CQI updating for each stream based on effective channels obtained from SRS1 and SRS2, and uses the updated CQIs to perform optimization of the MCS to be used by mobile station 100 in the next communication.

Also, as shown in FIG. 8, SRS3 and SRS4 are transmitted in subframe #2 in addition to SRS1 and SRS2. By this means, in a similar way to Embodiment 1, $\Phi(0)=\{\Phi^1(0), \phi^2(0), \phi_{inv}^1(0), \phi_{inv}^2(0)\}$ is obtained by the base station. Thus, the base station calculates channel matrix $H(n)$ indicating an actual channel state in the same way as with equation 3 of Embodiment 1, and performs precoding matrix $\phi$ and RANK number updating.

Thus, when the RANK number is 2, also, mobile station 100 transmits SRS1 and SRS2 in all of subframes #1 through #4 shown in FIG. 8, but transmits SRS3 and SRS4 only in subframe #2. By this means, a sub SRS channel allocated to SRS3 and SRS4 can be eliminated in three subframes—subframes #1, #3, and #4—in FIG. 2.

Thus, according to this embodiment, an increase in SRS resources can be suppressed, as in Embodiment 1, even when the RANK number (space multiplexing number) is 2 or more.

(Embodiment 3)

With LTE, a DM RS used for channel estimation for transmission data demodulation is added to transmission data, and is transmitted to a base station at the same time as transmission data. Also, in a radio communication system such as IMT-Advanced in which transmission data (uplink data) weighting is performed, a DM RS is weighted using a precoding matrix identical to a precoding matrix used for transmission data weighting. That is to say, a base station can estimate a transmission data effective channel state by using a DM RS. That is, it is possible for a base station to perform not only transmission data demodulation but also CQI updating using a DM RS. That is to say, a base station can use a DM RS for CQI updating in a similar way to an SRS weighted using a precoding matrix used for transmission data weighting in Embodiment 1 and Embodiment 2.

Thus, in this embodiment, a base station performs CQI updating using a DM RS, and performs precoding matrix and RANK number updating using an SRS. Also, a mobile station according to this embodiment controls an interval for using a precoding matrix orthogonal to a precoding matrix that weights a DM RS independently of a DM RS transmission interval.

Figure 9:
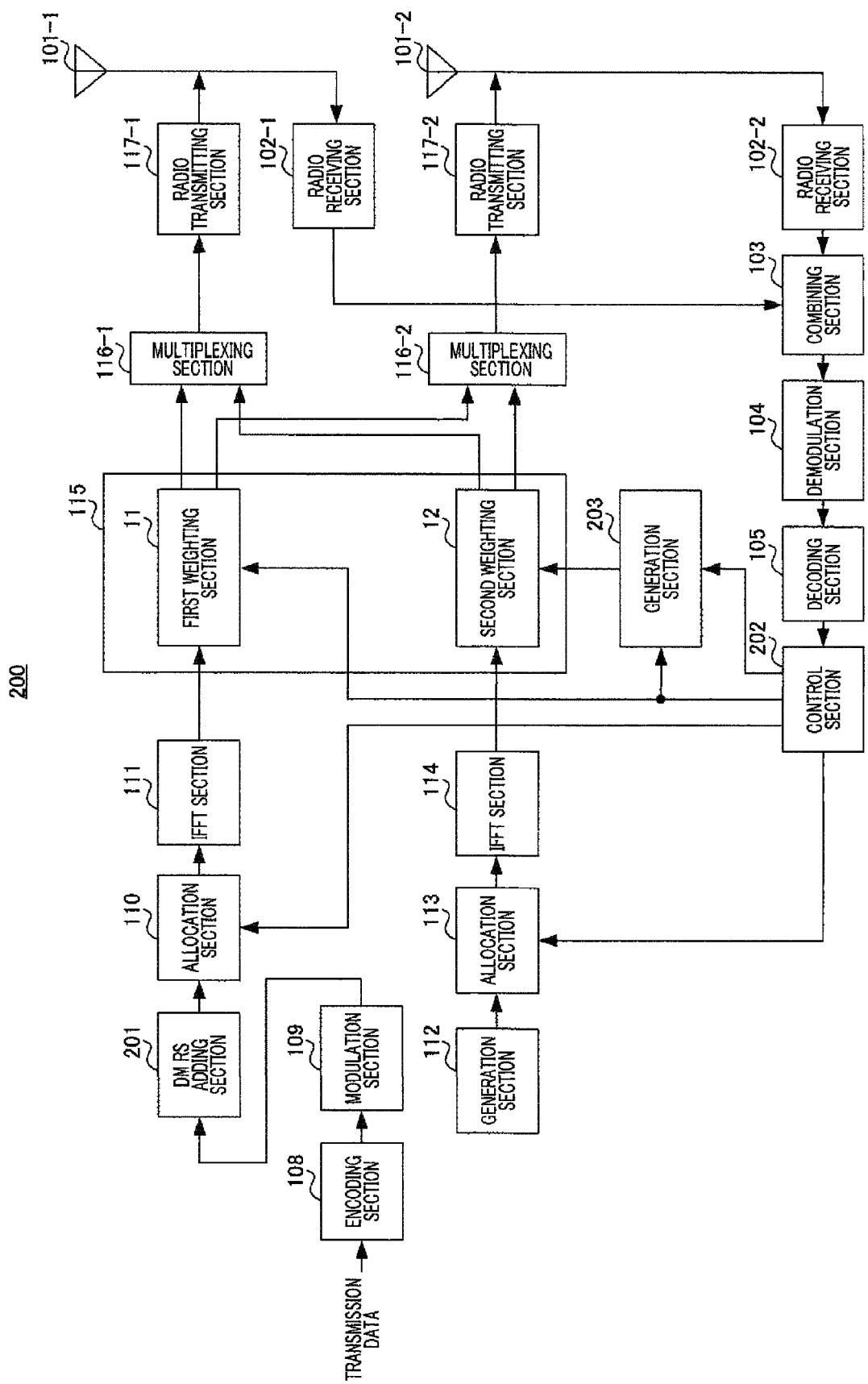
FIG. 9 is a block diagram showing a configuration of a mobile station according to Embodiment 3 of the present invention.

The configuration of mobile station 200 according to this embodiment is shown in FIG. 9. Configuration parts in FIG. 9 identical to those in FIG. 1 (Embodiment 1) are assigned the same reference codes as in FIG. 1, and descriptions thereof are omitted here.

DM RS adding section 201 adds a DM RS to modulated transmission data input from modulation section 109. Then DM RS adding section 201 outputs transmission data to which a DM RS has been added to allocation section 110.

Meanwhile, an interval for using precoding matrix $\phi_{inv}$ orthogonal to precoding matrix $\phi$ used for transmission data and DM RS weighting is set by control section 202 independently of a transmission data transmission interval—that is, a DM RS transmission interval. That is to say, as in Embodiment 1, control section 202 controls an interval for using precoding matrix $\phi_{inv}$ orthogonal to precoding matrix $\phi$ independently of an interval for using precoding matrix $\phi$ reported from the base station. Specifically, control section 202 decides an interval for using precoding matrix $\phi$ in accordance with an uplink data transmission directive sent from the base station, but decides an interval for using precoding matrix $\phi_{inv}$ in accordance with SRS time/frequency resource allocation information indicated beforehand by the base station independently of the uplink data transmission directive.

If directed by control section 202 not to generate precoding matrix $\phi_{inv}$ orthogonal to precoding matrix $\phi$, generation section 203 does not output anything to weighting section 115. That is to say, generation section 203 performs processing equivalent to outputting $(0,0)^T$ as a precoding matrix. On the other hand, if directed by control section 202 to generate precoding matrix $\phi_{inv}$ orthogonal to precoding matrix $\phi$, generation section 203 generates precoding matrix $\phi_{inv}$ orthogonal to precoding matrix $\phi$ input from control section 202, in a similar way to generation section 107 of Embodiment 1 (FIG. 1).

First weighting section 11 of weighting section 115 weights transmission data and a DM RS using precoding matrix $\phi$ input from control section 202. Also, second weighting section 12 of weighting section 115 weights an SRS using precoding matrix $\phi_{inv}$ input from generation section 203. That is to say, only an SRS weighted using precoding matrix $\phi_{inv}$ is generated by second weighting section 12.

Figure 10:
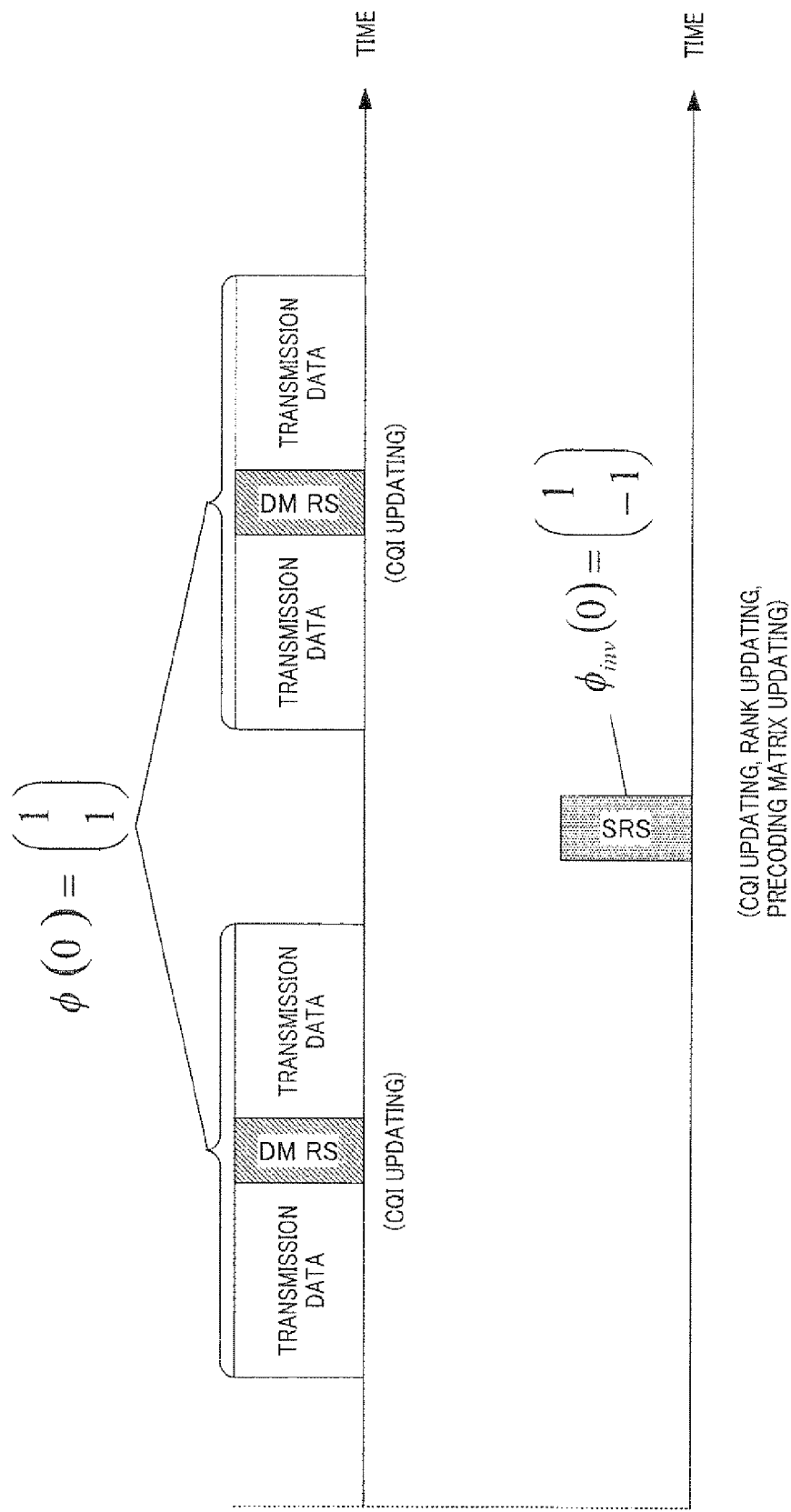
FIG. 10 is a drawing showing an example of SRS transmission according to Embodiment 3 of the present invention.

FIG. 10 shows an example of SRS transmission by mobile station 200. In the following description, mobile station 200 transmits transmission data and a DM RS added to the transmission data at transmission timing indicated by the base station, as shown in the upper part of FIG. 10. For a precoding matrix that weights transmission data and a DM RS, $\phi(0)=(1,1)^T$ is assumed, and for a precoding matrix that weights an SRS (a precoding matrix generated by generation section 203), $\phi_{inv}(0)=(1,-1)^T$ is assumed. As shown in FIG. 10, precoding matrix $\phi(0)$ and precoding matrix $\phi_{inv}(0)$ are mutually orthogonal. Here, only a main SRS channel is defined, and an SRS weighted using precoding matrix $\phi_{inv}(0)$ is transmitted using the main SRS channel.

Control section 202 controls an interval for using precoding matrix $\phi_{inv}(0)$ orthogonal to precoding matrix $\phi(0)$ independently of the transmission interval of transmission data and a DM RS shown in the upper part of FIG. 10. For example, controls the interval for using precoding matrix $\phi_{inv}(0)$ so as to be an interval necessary for precoding matrix $\phi_{inv}(0)$ and RANK number updating, independently of the transmission interval of transmission data and a DM RS shown in the upper part of FIG. 10.

Next, on receiving a DM RS shown in the upper part of FIG. 10, the base station demodulates transmission data using the DM RS. The base station also performs CQI updating using the DM RS, and decides an MCS in a similar way to Embodiment 1. That is to say, the base station performs CQI updating using a DM RS instead of SRS1 in Embodiment 1 (FIG. 2).

Also, on receiving an SRS shown in the lower part of FIG. 10, the base station, as in Embodiment 1, calculates channel matrix H(n) indicating an actual channel state, and performs precoding matrix $\phi(n)$ and RANK number updating. Specifically, the base station calculates channel matrix H(n) indicating an actual channel state, in the same way as with equation 3 of Embodiment 1, from effective channel H(n)$\phi(0)$ obtained from the previously received DM RS, and effective channel H(n)$\phi_{inv}(0)$ obtained from the SRS. Then the base station performs precoding matrix $\phi(n)$ and RANK number updating using H(n).

Thus, mobile station 200 transmits only an SRS weighted using precoding matrix $\phi_{inv}(0)$ orthogonal to precoding matrix $\phi(0)$ used for DM RS (transmission data) weighting (that is, SRS2 in Embodiment 1 shown in FIG. 2). That is to say, an SRS for which precoding matrix $\phi(0)$ used for DM RS (transmission data) weighting (that is, SRS1 in Embodiment 1 shown in FIG. 2) is unnecessary. Consequently, the base station does not need an SRS resource allocated to an SRS for CQI updating (here, a sub SRS channel). Furthermore, in a similar way to Embodiment 1, a mobile station transmits an SRS at an interval necessary for precoding matrix $\phi$ and RANK number updating, independently of the DM RS transmission interval, enabling SRS resources to be kept to a necessary minimum.

Thus, according to this embodiment, a DM RS for demodulating transmission data is also used for CQI updating. Consequently, an SRS for CQI updating is unnecessary. Also, an interval for using a precoding matrix orthogonal to a precoding matrix used for DM RS weighting is controlled independently of the DM RS transmission interval. This enables an SRS resource to which an SRS is allocated to be kept to a necessary minimum. Therefore, according to this embodiment, an increase in SRS resources can be suppressed to an even greater extent than in Embodiment 1.

This concludes a description of embodiments of the present invention.

In the above embodiments, a case has been described in which an SRS of each antenna is transmitted using SRS channels (a main SRS channel and sub SRS channel) allocated periodically when a base station sets an initial value of a precoding matrix. However, with the present invention, any method may be used as long as an initial value of a precoding matrix is set. For example, a base station may allocate a non-periodical SRS resource (SRS channel) to each antenna only at the time of initial SRS transmission. By this means, the base station can receive an SRS using an SRS resource (SRS channel) used only at the time of initial SRS transmission, and can set an initial value of a precoding matrix. Also, a preset precoding matrix may be used as an initial value at the same time as a mobile station requests the start of uplink data communication. By this means, SRSs weighted using a precoding matrix preset by the base station and a precoding matrix orthogonal to that precoding matrix can be transmitted to the base station. Furthermore, instead of presetting a precoding matrix, an initial value of a precoding matrix may be set at the same time as a mobile station requests the start of uplink data communication.

In the above embodiments, a case has been described by way of example in which a Euclidian norm indicating the RSS of vector components of a precoding matrix is not 1. However, with the present invention, a precoding matrix for which the Euclidian norm is 1 may also be used. Examples of mutually orthogonal precoding matrices in the case of a Euclidian norm of 1 are $\phi(0)=(1/\sqrt{2}, 1/\sqrt{2})^T$ and $\phi_{inv}(0)=(1/\sqrt{2}, -1/\sqrt{2})^T$. When SRS1 used for weighting $\phi(0)$ for which the Euclidian norm is 1, and SRS2 used for weighting $\phi_{inv}(0)$ that is orthogonal to $\phi(0)$ and for which the Euclidian norm is 1, are transmitted, $\Phi(0)=\{\phi(0), \phi_{inv}(0)\}$ configured with $\phi(0)$ and $\phi_{inv}(0)$, used when channel information is obtained on the base station side, is a unitary matrix. With unitary matrix $\Phi(0)$, inverse matrix $\Phi^{-1}(0)$ is transposed matrix $\Phi(0)^T$ (that is, $\Phi^{-1}(0)=\Phi(0)^T$). Therefore, the base station can calculate transposed matrix $\Phi(0)^T$ instead of inverse matrix $\Phi^{-1}(0)$, enabling H(n) to be calculated more easily.

A mobile station may be termed "UE" and a base station "Node B".

In the above embodiments, a case has been described by way of example in which the present invention is configured as hardware, but it is also possible for the present invention to be implemented by software.

The function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosure of Japanese Patent Application No. 2008-098395, filed on Apr. 4, 2008, including the specification, drawings and abstract, is incorporated herein by reference in its entirety.

Industrial Applicability

The present invention is suitable for use in a mobile communication system or the like.

The invention claimed is:

1. A radio communication mobile station apparatus comprising:

a weighting section that weights a first reference signal using a first preceding matrix and weights a second reference signal using a second precoding matrix orthogonal to the first precoding matrix; and a control section that controls a first interval, at which the first precoding matrix is used for weighting the first reference signal for updating a channel quality index (CQI), and controls a second interval, at which the second precoding matrix is used for weighting the second reference signal for updating the first precoding matrix and a RANK number.

2. The radio communication mobile station apparatus according to claim 1, wherein the control section makes the second interval greater than the first interval.

3. The radio communication mobile station apparatus according to claim 1, wherein the first interval and the second interval are intervals in the time domain.

4. The radio communication mobile station apparatus according to claim 1, wherein:
the weighting section weights a plurality of the first reference signals using a plurality of the first precoding matrices that are mutually orthogonal, and weights a plurality of the second reference signal using a plurality of the second precoding matrices that are orthogonal to all of the first precoding matrices.

5. The radio communication mobile station apparatus according to claim 1, wherein the first interval and the second interval are controlled independently of each other.

6. A radio communication mobile station apparatus comprising:
a first weighting section that weights transmission data using a first precoding matrix;
a second weighting section that weights a reference signal using a second precoding matrix orthogonal to the first precoding matrix; and
a control section that controls a first interval, at which the transmission data is transmitted, and a second interval, at which the second precoding matrix is used for weighting the reference signal for updating the first precoding matrix and a RANK number.

7. The radio communication mobile station apparatus according to claim 6, wherein:
the first weighting section further weights another reference signal, which is added to the transmission data, using the first precoding matrix.

8. A method for using a precoding matrix, comprising:
weighting a first reference signal using a first precoding matrix; and
weighting a second reference signal using a second precoding matrix orthogonal to the first precoding matrix; and
controlling a first interval, at which the first precoding matrix is used for weighting the first reference signal for updating CQI, and a second interval, at which the second precoding matrix is used for weighting the second reference signal for updating the first precoding matrix and a RANK number.

9. A method for using a precoding matrix comprising:
weighting transmission data using a first precoding matrix;
weighting a reference signal using a second precoding matrix orthogonal to the first precoding matrix; and
controlling a first interval, at which the transmission data is transmitted, and a second interval, at which the second precoding matrix is used for weighting the reference signal for updating the first precoding matrix and a RANK number.

* * * * *

UNITED STATES PATENT AND TRADEMARK OFFICE
CERTIFICATE OF CORRECTION

PATENT NO.         : 8,374,277 B2                                    Page 1 of 1
APPLICATION NO.    : 12/920024
DATED              : February 12, 2013
INVENTOR(S)        : Seigo Nakao et al.

It is certified that error appears in the above-identified patent and that said Letters Patent is hereby corrected as shown below:

In the Claims

Claim 1, column 16, line 62 incorrectly reads:

"using a first preceding matrix and weights a second"

and should read

"using a first precoding matrix and weights a second".

Signed and Sealed this
Eighth Day of April, 2014

Michelle K. Lee
*Deputy Director of the United States Patent and Trademark Office*